United States Patent [19]
Tatnall

[11] Patent Number: 5,925,251
[45] Date of Patent: Jul. 20, 1999

[54] CHEMICALLY TREATED FILTERS

[76] Inventor: Robert E. Tatnall, 10 McCarthy Rd., Chadds Ford, Pa. 19317

[21] Appl. No.: 08/871,710

[22] Filed: Jun. 9, 1997

[51] Int. Cl.[6] .................................................. B01D 39/00
[52] U.S. Cl. ............... 210/500.39; 210/490; 210/500.38; 210/500.27
[58] Field of Search ............................. 210/490, 500.38, 210/500.37, 500.39, 500.27, 504, 505, 506

[56] References Cited

U.S. PATENT DOCUMENTS

| | | | |
|---|---|---|---|
| 4,203,847 | 5/1980 | Grandine, 2nd | 210/490 |
| 4,250,029 | 2/1981 | Kiser et al. | 210/490 |
| 4,770,790 | 9/1988 | Oberhofer | 210/673 |
| 5,279,738 | 1/1994 | Seita et al. | 210/500.38 |

*Primary Examiner*—Ana Fortuna

[57] ABSTRACT

A filter for removing particulate from petroleum distillate fuels exhibiting improved resistance to plugging due to sludge formation during use is disclosed. The filter is a conventional fibrous, paper, sintered metal or sintered ceramic filter capable of removing at least 50 weight percent of the particulates from a petroleum distillate fuel. The filter medium has deposited thereon a substantially continuous coating which is comprised from 0 to 50 weight percent of a film forming amine and from 50 to 100 weight percent of a biodispersant. The film forming amine film is, preferably, N-(cocoalkyl)-1,3-propane diamine. The preferred biodispersants are the imidazolines of which 1-(2-hydroxyethyl)-2-octyldecyl-2-imidazoline is most preferred.

5 Claims, No Drawings

CHEMICALLY TREATED FILTERS

FIELD OF THE INVENTION

The present invention relates to improved filters for removing particulates from distillate hydrocarbon fuels, which filters prevent the build-up of sludge therein or thereon during use.

BACKGROUND OF THE INVENTION

Distillate hydrocarbon fuels are widely used for residential and industrial heating, diesel engines, jet engines, etc.. Generally such fuels are filtered just prior to use to remove any particulates which might clog or foul nozzles, strainers, injectors, etc..

Upon storage, distillate fuels are subject to contamination with water from multiple sources, such as condensation from the atmosphere or entrance of ground water into the storage vessel. The contamination frequently results in a discreet water phase. The aqueous contamination supports the existence and growth of bacteria and other microorganisms. These bacteria, etc., live in the aqueous phase present in the fuel and utilize the fuel as a source of carbon ( i.e., food), degrading the fuel in the process and producing dark-colored particulates of high molecular weight as a byproduct of this degradation. Some of the microorganisms responsible for this degradation process produce extracellular polymers or exopolysaccharides commonly known as "slime". The slime mediates the environment about the microorganism, contributing to the microorganism's ability to obtain food and protection necessary for survival and growth. This slime is quite sticky and tends to bind together the degraded fuel particles as well as other similar particulates formed in the bulk fuel by direct chemical oxidation during storage. The resulting dark, sticky mass is commonly referred to as "sludge".

When sludge is present in a steel tank, corrosion of the tank is also observed. Whether this is due to direct action of the microorganisms, physical/chemical conditions generated by the presence of the sludge itself (e.g., an oxygen differential situation), or by acids or other directly corrosive species generated by the overall process is not clear. What is known, however, is that accelerated corrosion of the steel occurs in the presence of biologically active sludge. The products of this corrosion(i.e., iron oxide or "rust") also accumulate in the sludge giving it additional bulk.

Occasionally, sludge mass is passed from the storage tank through the oil lines to the filter. This frequently occurs when fuel oil is added to the storage tank and the force of the incoming fuel oil disturbs the aqueous layer and the sludge is broken into smaller pieces that are carried out of the tank with the fuel. The sludge with its living organisms is captured by the filter, and the organisms proceed to function on the filter, eventually producing slime and sludge on/and throughout the filter media. The presence of this sludge greatly shortens the effective life of the filters used to remove particulate from the fuel. In addition to fouling the filter itself, slime has been shown to break off the downstream side of the filter and be carried by the fuel flow. This entrained sludge often causes fouling of strainers and nozzles.

In the past various biocides have been used in an attempt to prevent growth of bacteria and other microorganisms in distillate fuel being stored in tanks, and thus prevent formation of sludge. The use of such biocides has been found to be not as effective as desired in preventing fouling of filters, and, furthermore, requires replenishment of the biocide as the fuel is being replenished in the storage tank. More recently it has been discovered that the use of certain corrosion inhibitors such as imidazolines and diamines can inhibit the formation of sludge. The diamines are effective corrosion inhibitors and are known to leave solution and coat the metal walls of a container providing a protective shield against the liquid in the container. This type of surface active compound is referred to as a "filming" compound. The imidazoline, a corrosion inhibitor, is also a filming compound. It is not recognized in the trade that such filming compounds are also effective in preventing and dispersing sludge deposits.

Surprisingly, when tested, the imidazoline was found to be able to remove existing sludge and prevent sludge accumulation. It is our observation that the imidazoline is a biodispersant as it disperses existing sludge and prevents the formation of new sludge by dispersing slime as it is generated by the living organisms. However, when tested in combination with a film forming amine, it is found that this mixture is more effective than either component alone in removing and preventing sludge accumulation. Furthermore, additional tests have shown that the imidazolines of interest do not function as biocides to achieve elimination of sludge accumulation.

DETAILED DESCRIPTION

The present invention involves the discovery that microporous filters used to remove particulates from distillate fuels can be treated with an imidazoline singularly or as a mixture with a film forming amine to obtain a filter which will remain free of sludge growth for an extended period of time for filtering distillate hydrocarbon fuels. The preferred treatment of the microporous filters used to remove particulates from distillate fuels is with a combination of a filming amine and a filming imidazoline biodispersant prior to use to provide microporous filters which will remain free from fouling by sludge for an extended period of time when used to filter distillate hydrocarbon fuels. Relative to singular treatment with a filming imidazoline biodispersant, a treatment with a mixture of the filming amine and filming imidazoline biodispersant is more effective in preventing sludge formation.

The preferred filming amines are diamines of the chemical formula:

where n is an integer from 4–22. While such film forming amines have been used to prevent corrosion of steel storage tanks in the past, in the present case they appear to form a film on the filter medium which enhances the sludge control function of an imidazoline biodispersant.

Various filming imidazolines are suitable for use herein. The preferred imidazolines useful herein generally have the formula:

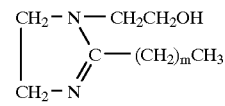

where m is an integer from 12–26. The especially preferred imidazoline is 1-(2-hydroxyethyl)-2-octadecyl-2-imidazoline. Non-filming imidazolines can be used satisfactorily in combination with filming amines.

The preferred coating will comprise from 0 to 50 weight percent filming amine and from 50 to 100 weight percent imidazoline biodispersant.

Generally the filming amine and the imidazoline biodispersant, either by themselves or in combination, are applied to the filter medium as a solution thereof in a volatile solvent which, after application to the filter, is removed from the filter by evaporation. The solution generally is applied to the filter medium by spraying said solution onto the filter medium or by dipping the filter medium in said solution. Suitable solvents include, but are not limited to, alcohols such as methanol and ethanol, and ketones such as acetone and methyl ethyl ketone. Multiple applications of the solution to filters are possible.

The filters used herein are those filters conventionally used to remove particulates from distillate hydrocarbon fuels. These include fibrous filters formed from woven or non-woven felts, wound yarns or papers, of natural or synthetic fibers. Suitable natural fibers include cotton, wool, silk, fax, cellulosic fibers, etc. Suitable synthetic fibers include but are not limited to polyamides, polyesters, polyimides, polyacrylics, polyolefins, derived cellulosics, rayon, polyaramides, polyvinyl alcohol, polyvinylhalides and synthetically modified cellulosics such as rayon, cellulose acetate, etc.. Suitable filters can also be formed by sintering metal particles, ceramic particles or fritted glass. Suitable metals include, but are not limited to, stainless steel, bronze, brass, and aluminum. Suitable ceramic filters are made by firing particles made from silica, alumina, titania, etc..

EXAMPLES

Examples 1–4 pertain to the unexpected performance of imidazolines and mixtures of imidazolines with film forming amines to be efficacious in removing sludge and preventing the formation of slime deposits leading to sludge accumulation. Examples 5 and 6 pertain to the production and performance of the filters.

Example 1

Previous laboratory studies to document corrosion performance have shown that sludge formation in filters can be approximated by using twine wrapped around bundles of nails. The bound nails are then submerged in fuel oil that has been contaminated with a small quantity of biologically active sludge and water. The resulting growth on the nail bundle, and especially on the wraps of twine, is similar in composition, color and texture to the sludge that normally grows on and blinds fuel oil filters.

In one laboratory experiment, three bundles made up of twenty 10d common steel nails, were each wrapped with twenty turns of #18 seine twine "cable cord" made of a blend of cotton and polyester fibers and manufactured by John H. Graham & Company of Oradell, N.J. The twine was wrapped about the center of each nail bundle so as to cover only about the middle one fourth of the nail bundles, and was then tied securely around the nails.

One of these bundles was placed in each of three 5 gallon glass carboys, followed by five gallons of diesel fuel in each carboy. Two milliliters (ml) of water was placed in each carboy, said water having been condensed from the air in a home dehumidifier.

One of the carboys was treated with 1.2 ml of a mixture containing one part by volume of a commercial fuel stabilizer, "Nalco 5302", manufactured by Nalco Chemical Company, Naperville, Ill., and two parts by volume of kerosene "K-1" (Solution "1"). The fuel stabilizer is a blend of a proprietary amine substituted resin designed to inhibit fuel degradation by oxidation (40–70%), heavy aromatic naphtha(20–40%) and 1-(2-hydroxyethyl)-2-alkyl(C-18)-2-imidazoline corrosion inhibitor (25%).

The second carboy was treated with 1.2 ml of a mixture containing 1.92 parts by volume of the aforementioned amine substituted resin fuel stabilizer, 3.84 parts by volume of a distillate fuel dehazer, "Nalco 5457", and 6.24 parts by volume kerosene "K-1" (Solution "2"). The fuel dehazer contains ethylbenzene (5–10%), heavy aromatic distillate (40–70%), xylene (5–10%), naphthalene (1–5%) and cumene (1–5%), plus possibly one or more other ingredients not disclosed by the manufacturer, and was proposed at this dose to disperse and help remove water from fuels.

The third carboy received no additional chemical treatment and served as the experimental control.

These carboys were covered to exclude light, left loosely covered to allow them to breath as temperatures rose and fell, and stored in an outdoor shed. At weekly intervals, one gallon of fuel was removed from each carboy to simulate consumption of fuel from a fuel oil storage tank. At week four, when each carboy had two gallons of fuel remaining, fresh diesel fuel was added to fill the carboys, each received another two ml of water condensate, and the two treated carboys were again treated with 1.2 ml of Solution 1 and Solution 2 respectively. The carboys were then filled to the five gallon level with "fresh" diesel fuel. ("Fresh" diesel fuel in this and subsequent examples means commercial No. 2 diesel fuel, reputedly without chemical additives, purchased within thirty days of use from a local automotive service station.)

At month three of this test each carboy received a one-time dose of two ml of fuel oil sludge which had been removed from a fuel oil storage tank, and the test continued as above for another three months.

At the conclusion of the test the nail bundles were removed and inspected. The bundle from the untreated carboy was seen to have a heavy accumulation of black sludge in and around the twine wraps and extending outward between the nails. Also observed were several orange-colored localized deposits which were presumed to be iron corrosion products. The nail bundle removed from the carboy treated with the fuel stabilizer/imidazoline/kerosene mixture (Solution 1) was essentially clean, with no visible sludge accumulation nor corrosion product deposits. In essence it appeared as it did when the test started. The nail bundle removed from the carboy treated with the fuel stabilizer/dehazer/kerosene mixture (Solution 2) showed a heavy buildup of black sludge covering the twine wraps and extending outward within the nail bundle, but no visible signs of orange-colored deposits. This latter bundle was considered to be fouled as badly as was the bundle from the untreated control.

The results of this test led us to conclude that 1) the imidazoline present only in Solution 1 was acting as more than a corrosion inhibitor, and was also preventing sludge growth and accumulation both on fibrous materials (twine) and on steel surfaces (nails), and 2) the mixture of fuel stabilizer and dehazer (Solution 2) was not providing this same function.

Example 2

Four nail bundles were made up as described in Example 1, except that each bundle contained only twelve nails and twelve wraps of twine. One bundle was placed in each of four one-gallon screw-topped containers of polyethylene terephthalate (PET) plastic. All four containers were filled with diesel fuel and injected with approximately two ml of sludge and water made by gathering the solids from the fuel/water interface in the control carboy of Example 1, together with the water from that carboy, and homogenizing this mixture in a kitchen blender for several minutes.

One of these containers was treated with 1.6 ml of a mixture comprising equal parts by volume of the Nalco 5302 imidazoline/fuel stabilizer product described in Example 1 and heavy aromatic naphtha (Solution "3"). The second container was treated with 1.6 ml of a mixture made by combining one part (by volume) of the same imidazoline used in Nalco 5302 as described in Example 1, one part of N-coco-1,3-diaminopropane, two parts of dipropylene glycol monomethyl ether, and four parts of heavy aromatic naphtha (Solution "4"). The third container was treated with 1.6 ml of a mixture made by combining one part (by volume) of imidazoline, two parts dipropylene glycol monomethyl ether, and four parts of heavy aromatic naphtha (Solution "5"). The fourth container was not treated and served as the control.

These four containers were placed in a dark room indoors. At monthly intervals, approximately sixty percent of the diesel fuel was removed from each container, replaced with fresh fuel, the containers treated as above except with only 0.8 ml of each solution, and one or two ml of water condensate added to each container.

After four months it was observed that there was significant growth of sludge and lighter colored filamentous growth of undetermined nature on the twine wraps of the untreated control bundle. A significant amount of filamentous growth was also observed on the twine wraps of the bundle treated with the imidazoline/glycol ether/ naphtha solution (Solution 5), although the amount of growth was judged to be much less than in the untreated control container. At this time, the treatment with Solution 5 was discontinued and that jug was treated instead with 0.8 ml of a mixture made by combining two parts (by volume) of the imidazoline, one part of the N-coco-1,3-diaminopropane, three parts of the dipropylene glycol monomethyl ether and four parts of the heavy aromatic naphtha (Solution "6").

After fourteen months of this test it was observed that the twine wraps on the untreated bundle were heavily covered with a dark growth of sludge and filamentous growth. The wraps on the bundle treated with Solution 3 also showed a dark sludge covering, although much less than on the untreated control. The wraps on the bundles treated with Solutions 4 and 6 showed only a trace of discoloration and no visible buildup. Significantly, the wraps on the bundle treated first with Solution 5, and later with Solution 6, had lost almost all of the growth evident when treatment was switched from Solution 5 to Solution 6.

From this experiment it was concluded that 1) the addition of N-Coco-1,3-diaminopropane enhances the sludge preventing characteristics of imidazoline alone, and 2) that treatment with a mixture containing the ingredients of Solution 6 can not only prevent the growth of sludge on surfaces, including fibrous surfaces such as twine, but can also cause existing growth to dissipate.

Example 3

A sludge inoculum was prepared by drawing off 100 ml of the biomass "sludge" at the fuel/water interface of the untreated carboy in Example 1, mixing with 150 ml of tap water, and homogenizing in a kitchen blender for approximately one minute. Approximately 20 ml of this mixture was placed into each of three one-quart glass jars. To each jar was added an additional 100 ml of tap water to produce a layer in the bottom of each approximately ½" deep of sludge-contaminated water. These jars were then filled to within approximately 1" of their tops with diesel fuel.

Steel test "coupons" were prepared by cutting rectangular pieces of 0.025" thick mild steel shim stock, 3" by 1½", and then bending these pieces in the middle at a right angle. One coupon was placed in each jar, one side of the coupon acting as a flat base to sit on the bottom of the jar, and the other part of the coupon standing vertically up through the water layer, fuel/water interface, and into the fuel layer.

One jar was treated with 0.3 ml of the imidazoline/fuel stabilizer/naphtha Solution 3 as used in Example 2. A second jar was treated with 0.07 ml of a commercial fuel preservative, "Fuel Guard" sold by Parke-Hill Chemical Company, Mount Vernon, N.Y. This product contains approximately 45% by weight of Hexahydro-1,3,5-tris(2-hydroxyethyl)-S-Triazine, and is touted to be a broad-spectrum biocide. The third jar was left untreated and served as the experimental control. These jars were placed in a dark box indoors and allowed to remain essentially undisturbed.

At monthly intervals the diesel fuel was removed from these jars to within approximately ¾"–1" from the bottom of the jars, the jars were retreated with their respective chemicals, and then refilled with fresh diesel fuel.

At month eight of this experiment the tests were ended. The steel coupons were removed and inspected. The coupon from the untreated jar had a heavy, uniform rust film on all surfaces exposed to the water layer, an overall covering of a slimy film on those surfaces as well, and an especially heavy encrustation of solids at the fuel/water interface which appeared to consist of biological slime, black, degraded fuel, and iron corrosion products. This encrustation stood out approximately ⅛" from the surfaces of the steel coupon.

The coupon from the jar treated with the imidazoline/fuel stabilizer/naphtha solution(Solution 3) showed no such corrosion product nor buildup of biomass at or near the fuel/water interface. Rather, the steel surfaces above, at and below the interface appeared bright and unaffected, and free from any buildup save a small spot, approximately 3⁄16" in diameter, of soft, easily removed black "slime" near the bottom of the vertical leg.

The coupon from the jar treated with the Fuel Guard preservative/biocide appeared very similar to that from the untreated jar, except that it showed an even heavier overall coating of a slimy buildup on all surfaces exposed to the water layer.

The fuel was removed from the three jars, and the remaining water and solid materials were poured through a small kitchen strainer to judge the degree of cohesion or dispersion of those solids. Both the materials from the untreated jar and that treated with the fuel preservative/biocide left large amounts of undispersed biomass, slimy in consistency, on the strainer. The respective pieces of retained biomass appeared to measure from approximately 1½" to 1½" in breadth while in the strainer.

The "solids" from the jar treated with the imidazoline/fuel stabilizer/naphtha solution(Solution 3) were noticeably less than in the other two cases while still in the jars, and passed through the strainer easily and completely, save two or three small, black masses which measured less than 1⁄16" in diameter.

Aliquots of the water from the three jars, as well as of the "solids" originally floating at the respective fuel/water interfaces, were diluted 10:1 with filter-sterilized carbonate buffered water, and relative numbers of viable colonies of heterotrophic bacteria were determined using "Hycheck"

Total Count plate agar devices manufactured by Difco Laboratories, Detroit, Mich. The relative bacterial counts for the untreated jar were "heavy" for the water sample and "too numerous to count" (TNTC) for the interface material. Similar samples from the jar treated with the imidazoline/fuel stabilizer/naphtha solution(Solution 3) were "moderate-to-heavy" for the water phase and "TNTC" for the interface material. These numbers were judged, within the accuracy limitations of the method, to be essentially similar.

The bacteria counts for the jar treated with the fuel preservative/biocide were "light-to-moderate" for the water phase and "heavy" for the interfacial material. These numbers were clearly at least one order of magnitude lower than those obtained in the other two jars.

From this experiment it was concluded that 1) the imidazoline-containing Solution 3 did not significantly alter the overall bacteria population, either in the water phase or the interfacial material, yet it dramatically reduced the tendency for biomass and slime to build and stick to surfaces, 2) the biomass which did form in the jar treated with that solution was quite dispersed—i.e. not bound together by biologically produced slime, and 3) although a commercial biocide did reduce bacteria populations by at least an order of magnitude, it appeared to do nothing to alleviate growth within biomass, adherence of biomass to surfaces, and cohesion of interfacial material. This further supports our claim that imidazoline itself does not act as a biocide, but does act to disperse and/or break down biologically produced slime.

Example 4

Five one quart glass jars were set up as in Example 3, with sludge/water inocula, diesel fuel and steel coupons.

Two of these jars were treated with 0.3 ml of the imidazoline/fuel stabilizer/naphtha solution(Solution 3) described in Example 2, and two jars were treated with 0.3 ml of the imidazoline/diaminopropane/glycol ether/naphtha solution(Solution 6) also described in Example 2. The fifth jar was left untreated and served as the experimental control.

These five jars were largely drained of fuel and refilled with fresh fuel monthly as described in Example 3. Unlike the previous example, however, only one of the jars treated with each of the two different chemical mixtures was treated each month. The other jar treated with each of those mixtures was treated only every third month, although the fuel was changed every month as in the other jars.

After fourteen months the coupons from these jars were inspected. The control coupon from the untreated jar showed a uniform coating of rust and slime on all surfaces exposed to the water layer, and a slight buildup of slimy appearing deposit at and near the fuel/water interface. The jar itself had an opaque layer of light gray/brown biomass at the fuel/water interface, estimated to be approximately $\frac{1}{8}$" thick and covering the entire surface. When removing the coupon for inspection it was apparent that this biomass was coherent—i.e. bound by biologically produced slime.

Both of the coupons from jars treated monthly with Solution 3 and Solution 6 respectively appeared virtually "like new", with no visible rusting or surface deposits except for a small area of rusting, approximately $\frac{1}{16}$" wide by 1" long on the coupon form the jar treated with Solution 3, and located along the underside of the coupon at the bend and adjacent to the jar bottom. The jar treated with Solution 3 showed a slight amount of biomass floating at the fuel/water interface, but this consisted only of small pieces of dark product, typically less than $\frac{1}{16}$" in diameter, and clearly dispersed from each other and not bound by biologically produced slime. The jar treated with Solution 6 contained only three small particles of dark material of unidentified makeup and measuring approximately $\frac{1}{16}$" in diameter, floating at the interface.

Surprisingly, both of the jars with fuel changed monthly but treated only every third month appeared as good or better than those treated every month. The jar treated with Solution 3 every third month had about the same minor amount of floating particles as did the one treated monthly, but that coupon did not even have the thin band of rusting along the coupon underside.

From this experiment we concluded that 1) Solution 6, containing imidazoline plus diaminopropane performed somewhat better than did Solution 3 containing imidazoline but not the diaminopropane, and 2) both of these treatment mixtures have a residual beneficial effect, even after the fuel in the jar has been mostly removed and replaced at least twice. It is presumed that this is because the effective ingredients in these mixtures, imidazoline with or without diaminopropane, tended to coat and remain on the steel surfaces even after the fuel was replaced. The continuing benefit in the liquid at the interface is believed to be because the portion of those active ingredients that did not coat the metal surface passed partly from the fuel into the water layer, and so were not removed with the fuel.

Example 5

A solution was prepared of the following: an imidazoline, 80 ml, N-Coco-1,3-diaminopropane, 40 ml, and denatured alcohol (ethanol), 80 ml. The solution was warmed slightly to fully dissolve the ingredients. The solution was then placed in a hand operated spray bottle assembly, "Servistar All-Purpose Sprayer" distributed by Servistar Corporation, Butler, Pa.

A Unifilter Company, 43800 Grand River Avenue, Novi, Mich. Refill Number 88, gray felt filter cartridge weighing approximately 35 grams was placed on a turntable and rotated slowly while spraying the above solution onto its outer surface. This was continued until enough of the above solution is dispensed onto the filter to increase its "wet" weight approximately six grams (some of the alcohol having evaporated during spraying). At this point the filter was partially saturated, the solution having penetrated for some distance into the felt cartridge. The filter was then dried in air to evaporate the balance of the alcohol, leaving approximately 4 grams of the first two named ingredients on the fiber surfaces of the filter.

Example 6

A plurality of filter cartridges, prepared as described in Example 5, were installed in home heating oil filters designed to receive Unifilter Refill Cartridge No. 88. At the same time, a number of other filters, identical to these but without the chemical treatment, were installed in other home heating oil filters. After 1 year all of the filter cartridges were recovered and inspected.

Of the untreated filter cartridges, all were black, due to trapping of degraded fuel particles and other foreign matter. Many of the untreated filter cartridges also showed evidence of sludge growth as evidenced by a slimy blanket covering all of the outer surfaces of the filter and voluminous black biomass buildup, plus a noticeable resistance to the flow of fuel oil through the filters. Some of the untreated filter cartridges, in fact, had plugged beyond use during the year and had been replaced by service technicians during the year. In a few severe cases, filter cartridges in certain badly contaminated systems had to be replaced several times during the year.

In direct contrast, while many of the chemically treated cartridges were also black in color because of trapped particulates in the fuel, all of the treated cartridges were seen to be free of any slimy covering or black biomass, and all appeared to be functioning normally as filters.

The implications of this are that oil service technicians, who normally plan to replace filter cartridges once a year during the annual tune-up of the heating system, can use such treated filter cartridges with a clear expectation that they will last that year without failure or plugging by sludge/slime growth.

I claim:

1. A filter intended to remove articulates from distillate hydrocarbon fuel which is adapted to resist fouling by coating an imidazoline or a mixture of an imidazoline and a film-forming amine, wherein the imidazoline has the formula:

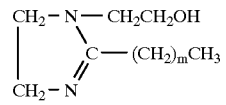

Wherein m is an integer from 12–26.

2. The filter of claim 1 where the value of m is 17.

3. The filter of claim 1 where the film-forming amine has the formula:

where n is an integer from 4 to 22.

4. The filter of claim 1 wherein the film-forming amine is N-(cocoalkyl)-1,3, propane diamine.

5. The filter of claim 1 wherein the coating comprises 0 to 50 weight percent of a film-forming amine and 50 to 100 weight percent of an imidazoline .

* * * * *